(No Model.) 2 Sheets—Sheet 1.
W. L. STEWART.
PNEUMATIC TIRE.
No. 579,846. Patented Mar. 30, 1897.
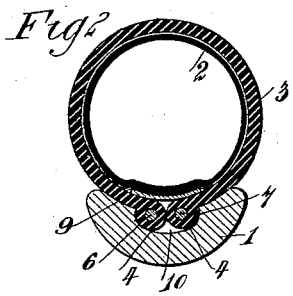
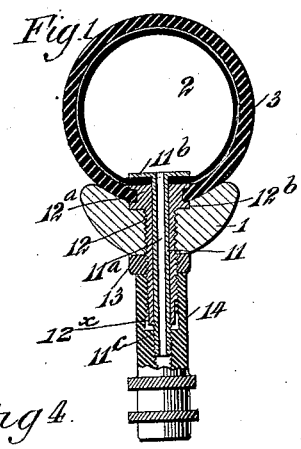
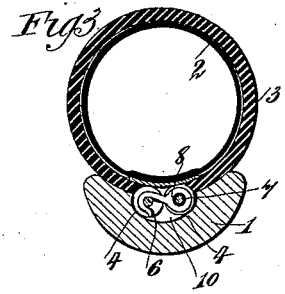
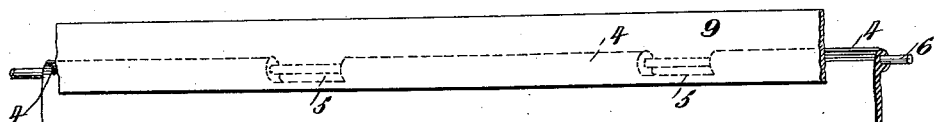
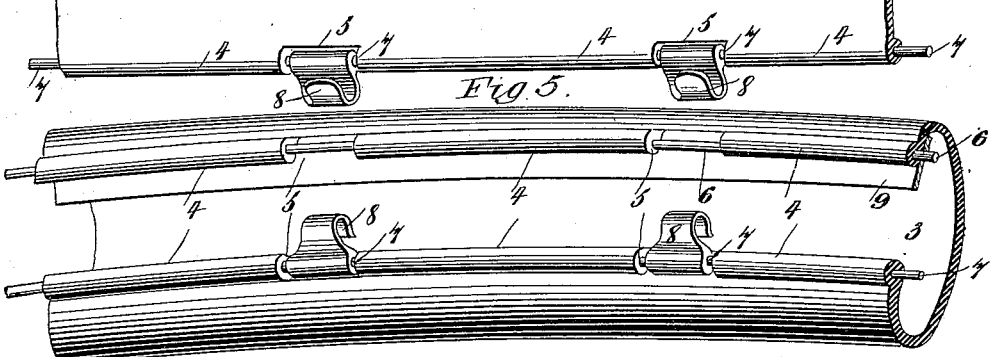
WITNESSES:
Paul Johst
J. B. Baplinger
INVENTOR
W. L. Stewart
BY Munn & Co
ATTORNEYS.

(No Model.) W. L. STEWART. 2 Sheets—Sheet 2.
PNEUMATIC TIRE.
No. 579,846. Patented Mar. 30, 1897.
Fig. 6.
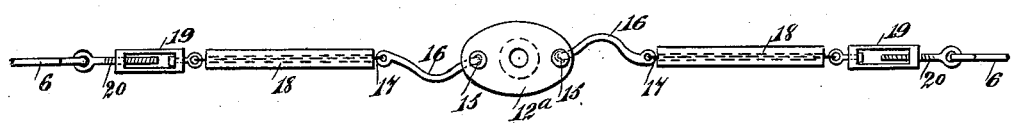
Fig. 7.
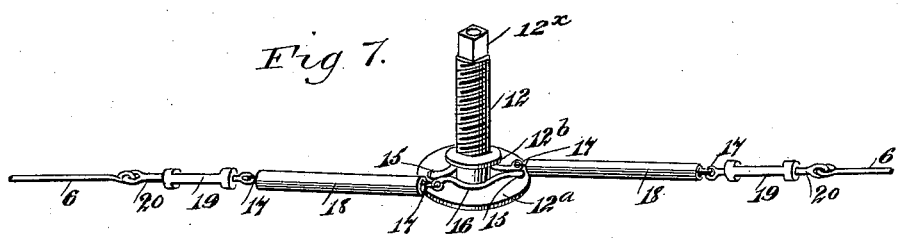
Fig. 8.
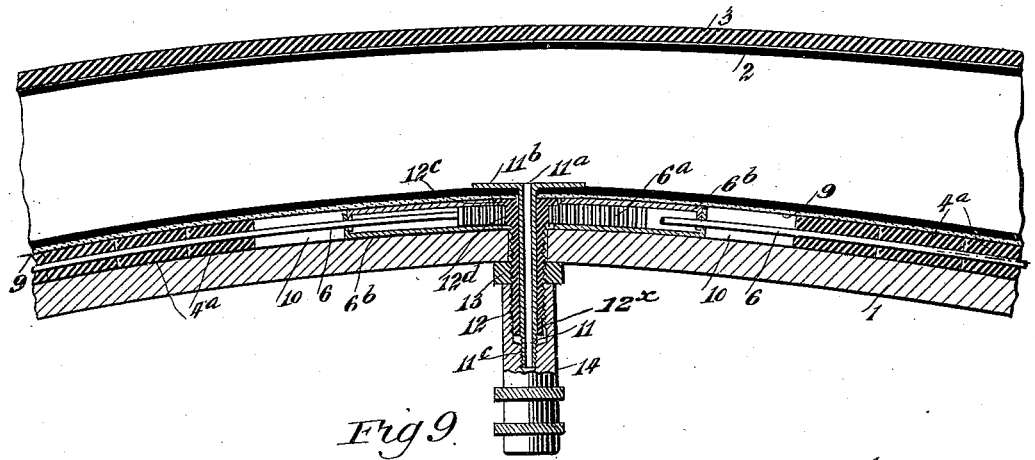
Fig. 9.
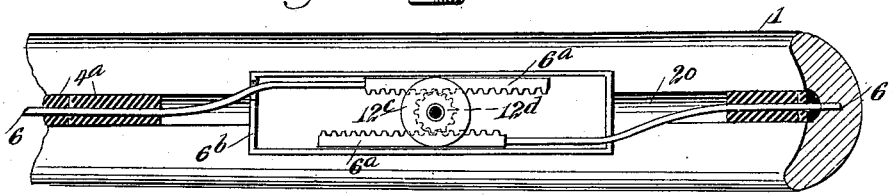
Fig. 10.
WITNESSES:
Paul Johas
J. B. Darlinger
INVENTOR
W. L. Stewart.
BY
Munn & Co
ATTORNEYS.

UNITED STATES PATENT OFFICE.

WILLIAM L. STEWART, OF WILMERDING, PENNSYLVANIA.

PNEUMATIC TIRE.

SPECIFICATION forming part of Letters Patent No. 579,846, dated March 30, 1897.

Application filed October 29, 1895. Serial No. 567,300. (No model.)

*To all whom it may concern:*

Be it known that I, WILLIAM L. STEWART, of Wilmerding, in the county of Allegheny and State of Pennsylvania, have invented a new and Improved Pneumatic Tire, of which the following is a full, clear, and exact description.

This invention relates to certain improvements in pneumatic tires such as are employed on bicycles and other vehicles, and has for its object to provide a tire of an improved construction which shall be cheap, simple, durable, and easily removable, being provided with improved devices for attaching it to the wheel-rim.

The invention contemplates certain novel features of the construction, combination, and arrangement of the various parts of the device whereby certain important advantages are attained, and the device is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1 is a section taken transversely through the tire at the valve-tube. Figs. 2 and 3 are similar sections taken through the tire at other points, showing the arrangement of the binding-wire of the cover or outer tube. Fig. 4 is a fragmentary view showing a section of the outer tube or cover and its binding-wire and fastening devices. Fig. 5 is a fragmentary perspective view showing the same partly closed. Figs. 6 and 7 are perspective views showing the construction of the operating devices of the binding-wire. Figs. 8 and 9 are sectional views taken at right angles to each other and showing a modified arrangement of the device for operating the binding-wire, and Fig. 10 is a fragmentary perspective view showing a modified form of the outer tube or cover.

In the views, 1 represents the rim of the wheel, and 2 represents the inner inflatable tube of the tire, which will usually be formed of soft expansible rubber.

3 represents the outer tube or cover, consisting, as shown in Fig. 4, of a flat band of rubber-coated fabric having eyes or hollow beads 4, formed at its opposite edges and alined with each other, said eyes or beads being separated by spaces 5 and being adapted to receive wires 6 and 7.

The wire 6 is the binding-wire and is connected at its opposite ends to its operating device, as will be hereinafter set forth, and the wire 7 forms a pivot for a series of hook-latches 8, arranged to work in the spaces 5 between the eyes or beads 4, which carry the wire 7, and having their hook-like ends arranged to engage the portion of the binding-wire 6 which is exposed at the spaces 5 at the opposite edge of the cover 3, as indicated in Fig. 3.

One edge of the cover 3 is provided on its inner side with a projecting flap 9 to overlap the joint between the two edges of the cover and present a smooth bearing-surface for the inner tube 2, and the beads 4 on the opposite edges of said cover project when the tire is inflated, as shown in Figs. 2 and 3, and are adapted to be received in a peripheral groove 10, formed in the rim 1, as clearly shown in said figures.

The valve-tube is composed of two parts 11 and 12, the part 11 fitting in the hollow of and being of greater length than the part 12, and said part 11 is provided with an air-passage $11^a$, leading into the inner tube 2, and has at its end a clamping-plate $11^b$ to bear on the inner side of said tube, as clearly shown in Fig. 1.

The extremity of the inner part 11 of the valve-tube is exteriorly screw-threaded, as shown at $11^c$, and is arranged to project slightly from the end of the part 12, and said part 12 is also exteriorly screw-threaded and is provided with a head or enlargement $12^a$, of circular form, between which and the clamping-plate $11^b$ on the part 11 the inner tube 2 is clamped, so as to prevent leakage at the valve-tube. The part 12 is also provided with a seat $12^b$ to receive the opposite edges of the outer tube or cover 3, and with a squared end $12^x$, adapted to receive a key or the like, whereby it may be turned.

The valve-tube passes through a perforation in the rim 1 in the usual way, and on the part 12 is arranged to screw a nut 13, which abuts against the rim and serves to hold the parts together, while outside said nut a valve-casing 14, having a valve and cap of suitable construction, is also secured on said part 12, being provided with an internal thread to receive the screw-threaded end 11$^c$ of the part 11 of the valve-stem.

To opposite sides of the disk or plate 12$^a$ are pivoted, as seen at 15, connecting-wires having bent central portions 16 and having their opposite outer ends connected to chains 17 or equivalent flexible connectors inclosed in rubber tubes 18 or the like, said chains being swiveled to turnbuckles 19, which receive screws 20, connected to opposite ends of the binding-wire 6, as clearly shown in Figs. 6 and 7.

In operation the latches 8 are engaged with the binding-wire 6, so as to form the cover 3 into a tube inclosing the inner tube, the part 12 of the valve-stem which is connected to the binding-wire 6 being held slipped on the part 11 of said valve-tube, which is inserted in the inner tube 2 of the tire.

The turnbuckles 19 are then operated to take up any looseness in the binding-wire, after which the tire in its deflated condition is placed on the wheel-rim 1, the beads 4 of the cover 3 taking into the groove or channel 10 of said rim and the valve-tube passing through the perforation in the rim. The nut 13 is then applied to hold the part 12 of the valve-tube in position, after which a key or wrench is applied to the square 12$^x$ of said part 12 to turn the disk 12$^a$ and draw the binding-wire endwise, so as to securely clamp the cover 3 to the rim 1. The valve-casing 14 is then applied and secured so as to bind the inner tube 2 between the clamping plates or disks 11$^b$ and 12$^a$, after which the tire may be inflated in the usual way.

The device shown in Figs. 8, 9, and 10 is substantially similar to that above described, except that in lieu of beads or eyes 4, formed correspondingly on opposite edges of the cover, the said edges are provided with eyes 4$^a$, which alternate, so that when a binding-wire is passed through them and drawn or tightened the eyes will be alined, so as to produce a single bead extending centrally around the inside of the tire and adapted to fit a corresponding groove or channel in the rim. The ends of the binding-wire 6 in this form of the device are connected to racks 6$^a$, playing in a casing 6$^b$, held in the rim, which casing is traversed by the valve-tube, and the outer part 12 of said tube is provided with a clamping-plate 12$^c$ to clamp the inner tube 2 and with a pinion 12$^d$ to engage the teeth of the racks 6$^a$, so that when said part 12 is turned the binding-wire will be tightened.

The device constructed as above described is of an extremely simple, cheap, and durable construction and does not necessitate the use of cement, nor does it depend on the compressibility of the rubber of the outer tube or cover to hold the tire in place. Furthermore, should the tire be punctured it is only necessary to deflate the inner tube and loosen the binding-wire 6, so as to permit the cover to be loosened, after which the puncture may be repaired and the tire again inflated.

It will be obvious from the above description of my invention that the device is susceptible of considerable modification without material departure from the principles and spirit of my invention, and for this reason I do not wish to be understood as limiting myself to the precise form of the device herein shown and described.

Having thus described my invention, I claim as new and desire to secure by Letters Patent—

1. The combination with a tire in the form of a flat band, means for connecting the edges of the band together, and a binding-wire in one edge of the said band, of a plate mounted to turn, bent links pivoted to opposite sides of the plate, turnbuckles secured to the ends of the binding-wire, and chains secured to the turnbuckles and links, substantially as described.

2. The combination with a wheel-rim, a tire in the form of a flat band, and a binding-wire for said band, of a valve provided with an inner and outer tube movable longitudinally and axially one upon the other, and means for connecting the binding-wire with one of the said tubes, whereby the binding-wire will be drawn endwise when the tube is turned, substantially as described.

3. The combination with a wheel-rim, a tire in the form of a flat band, a binding-wire, and an inner inflatable tube, of a valve provided with an inner and outer tube movable longitudinally and axially one upon the other and provided with heads on opposite sides of the inner tube, and to one of which the binding-wire is secured, whereby provision is made for clamping the inner tube between the said heads and drawing the binding-wire endwise to clamp the tire to the rim substantially as described.

4. The combination with a wheel-rim, a tire in the form of a flat band, a binding-wire for said band, and an inner inflatable tube, of a valve provided with an inner and outer tube provided with heads, the binding-wire being secured to the head of the outer tube and said tube being adapted to be turned to draw the binding-wire endwise to clamp the tire to the rim, and means for moving the said tubes one upon the other to clamp the inner inflatable tube between the heads of said valve-tubes, substantially as described.

5. The combination with a wheel-rim, a tire in the form of a flat band, an inner inflatable tube, and a binding-wire, of a valve provided with an inner and outer tube, the inner tube being provided with a clamping-plate and its end screw-threaded, and the outer tube screw-threaded and provided with a head having a seat to receive the edges of the tire and to which the ends of the binding-wire are connected, a nut on the outer tube, and a valve-casing screwing on the said tubes, substantially as described.

6. The combination with a rim having an annular central groove, a tire in the form of a flat band, a binding-wire for said band, means for connecting the edges of the band together, and an inner inflatable tube, of a valve provided with an inner and outer tube, the inner tube being provided with a head at its inner end and having its outer end screw-threaded, and the outer tube screw-threaded and provided with a head, to the opposite sides of which the ends of the clamping-wire are secured, said head being provided with a seat to receive the edges of the said band, a nut on the outer tube and securing the parts to the rim, and a valve-casing secured to the said outer tube, substantially as herein shown and described.

7. The combination with a wheel-rim, a tire in the form of a flat band, a binding-wire for the tire, and an inner inflatable tube, of a valve provided with an inner and outer tube, each having one end screw-threaded and provided with a head at the other end, bent links pivoted to opposite sides of the head of the outer tube and connected with the binding-wire, a nut on the outer tube, and a valve-casing screwing on the said tubes, substantially as herein shown and described.

WILLIAM L. STEWART.

Witnesses:
F. L. STEWART,
W. L. HANKEY.